United States Patent Office 3,062,844
Patented Nov. 6, 1962

3,062,844
6-METHYL-3-OXO-4:6-DIENIC STEROIDS
Bernard Ellis, Betty Eunice Hill, Vladimir Petrow, and David Morton Williamson, all of London, England, assignors to The British Drug Houses Limited, London, England, a British company
No Drawing. Filed Aug. 18, 1958, Ser. No. 755,389
Claims priority, application Great Britain Aug. 19, 1957
17 Claims. (Cl. 260—397.3)

This invention is for improvements in or relating to organic compounds and has particular reference to the preparation of new 6-methyl-3-oxo-4:6-dienic steroids.

It is an object of the present invention to provide new 6-methyl-3-oxo-4:6-dienic steroids which are of value on account of their biological properties or as intermediates in the preparation of other 6-methylated compounds with useful biological properties, such, for example, as 6-methylandrostanolone.

We have made the surprising discovery that the 6-methyl-6-dehydro derivatives of 3-oxo-$\Delta^4$-steroid hormones may be more active hormonally than the 3-oxo-4:6-dienic derivatives of androstane and pregnane and more active even than the corresponding 3-oxo-$\Delta^4$-steroid hormones.

Thus, for example, we have found that the 6-methyl-6-dehydro derivative of ethisterone when administered by the oral route is approximately twice as potent a progestational agent as is ethisterone itself.

The 6-methyl-3-oxo-4:6-dienic derivatives (I) of androstane and pregnane obtained by the process of the invention may be regarded as the 6-dehydro- derivatives of 3-oxo-6-methyl-$\Delta^4$-steroids, into which we find they may be converted by hydrogenation. The 3-oxo-6-methyl-$\Delta^4$- derivatives of androstane and pregnane, as is well known to those skilled in the art, are of importance on account of their biological properties.

According to the present invention there are provided 6-methyl-3-oxo-4:6-dienic steroids of the androstane and pregnane series having the general formula

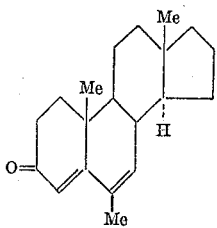

(I)

The invention also provides the specific new compounds 6-methylandrosta-4:6-diene-3:17-dione which is a dehydro- derivative of 6-methyl androstenedione, and is of value as an intermediate in, for example, the preparation of 6-methyl-6-dehydrotestosterone.

17β-hydroxy-6:17α-dimethylandrosta - 4:6 - dien-3-one, which is the dehydro-derivative of 6α:17α-dimethyltestosterone, and has anabolic properties.

17β-hydroxy-17α-ethynyl - 6 - methylandrosta-4:6-dien-3-one which is the dehydro-derivative of 6α-methyl-ethisterone and is a potent orally acting progestational agent.

6-methylpregna-4:6-diene-3:20-dione, which is a dehydro-derivative of 6α-methylprogesterone, is a progestational agent and is a valuable starting material for the preparation of the surprisingly potent 6-methyl derivatives of dehydrohydrocortisone.

The invention further provides a method for the preparation of 6-methyl-3-oxo-4:6-dienic steroids of the androstane and pregnane series having the general formula I above which method comprises reacting the corresponding 3β-hydroxy or 3β-acyloxy-5α-hydroxy-6-oxo-steroid having the general formula

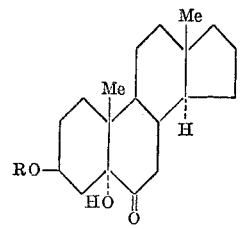

(II)

where R=H or acyl with a methylmagnesium halide to give a 6-methyl-3β:5α:6-trihydroxy steroid having the general formula

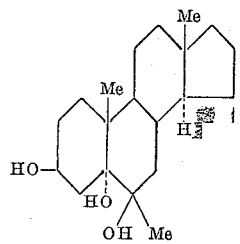

(III)

oxidising the 3β:5α:6-trihydroxy steroid to the corresponding 5α:6-dihydroxy-6-methyl-3-oxo-steroid having the general formula

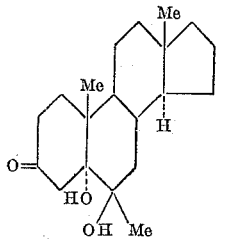

(IV)

and dehydrating the 5α:6-dihydroxy-6-methyl-3-oxo-steroid.

The 3β-acyloxy or 3β-hydroxy-5α-hydroxy-6-oxo-steroids which constitute the starting materials of the above mentioned process may be obtained by a variety of methods, such as, for example, by oxidation of the corresponding 3β-acyloxy-5α:6β-dihydroxy steroids which in turn may be derived from 3β-acyloxy-5:6-epoxy steroids by hydrolytic epoxide ring fission. Such transformations are well known to those skilled in the art, and have been adequately described in the literature. See Heusler and Wettstein, Helv. Chim. Acta, 1952, 35, 284.

In carrying the process of the invention into effect, the conversion of the 3β-acyloxy or 3β-hydroxy-5α-hydroxy-6-oxo steroid (II) into the 6-methyl-3β:5α:6-trihydroxy steroid (III) is conveniently achieved by adding a solution of the compound (II) (R=H or acyl) in a solvent such as ether or butyl ether, or a mixture of benzene and ether to an excess of methyl magnesium halide, preferably the bromide or iodide, and refluxing the mixture or allowing the mixture to stand at room temperature for several hours. Thereafter, the complex formed is decomposed and the steroidal product extracted. The 6-methyl-3β:5α:6-trihydroxy steroid (III) so obtained may be admixed with its 3β-acyloxy-derivative in amounts which are determined by the particular conditions and time employed for the Grignard reaction. It is, therefore, advisable to saponify the total product of the reaction in order to convert the admixed 3β-acyloxy-5α:6-dihydroxy-6-methyl steroid into the required 6-methyl-3β:5α:6-trihydroxy steroid (III).

The conversion of the 6-methyl-3β:5α:6-trihydroxy steroid (III) into the corresponding 3-oxo steroid (IV) may be accomplished by the use of oxidants commonly used for the transformation of a secondary alcohol into the corresponding ketone. Thus, chromium trioxide in acetic acid, or chromium trioxide in pyridine solution are suitable reagents, the particular oxidant employed, however, being determined by the nature of any substituents which may be additionally present in the 6-methyl-3β:5α:6-trihydroxy steroid (III).

Dehydration of the 3-oxo-steroid (IV) to the required 6-methyl-3-oxo-4:6-diene derivative (I) may be effected by treating compound (IV) in a solvent with a source of hydrogen ions, which is, conveniently, hydrogen chloride. The transformation may be achieved, for example, by passing hydrogen chloride into a solution of the 3-oxo-steroid (IV) at temperatures in the region of 0° C. Alternatively, for example, a solution of the 3-oxo steroid (IV) in a lower aliphatic alcohol containing up to five carbon atoms, such as methanol, or ethanol, to which a trace of concentrated hydrochloric acid has been added, may be heated at the reflux temperature when dehydration readily occurs.

The process of the invention may be applied to 3β-acyloxy or 3β-hydroxy-5α-hydroxy-6-oxo steroids belonging to the androstane and pregnane classes. Thus, the process of the invention may be applied to the following: 3β-acyloxy-5α-hydroxyandrostan-6-one which may be additionally substituted at $C_{17}$ by hydroxyl with or without alkyl, alkenyl or alkynyl groups containing not more than 5 carbon atoms, 3β-acyloxy-5α-hydroxypregnan-6-one which may be additionally substituted by an acyloxy or hydroxy group at $C_{20}$, with or without acyloxy or alkyl groups containing not more than 5 carbon atoms at $C_{17}$ or $C_{21}$.

Following is a description by way of example of methods of carrying the invention into effect:

EXAMPLE 1

*17α-Ethynyl-17β-Hydroxy-6-Methylandrosta-4:6-Dien-3-One (V)*

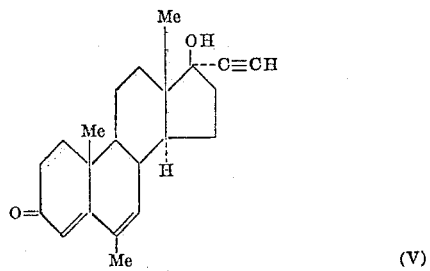

3β - acetoxy - 17α - ethynylandrostane - 5α:17β - diol-6-one (M.P. 245 to 247° C., $[\alpha]_D^{21}$ −103° in chloroform) (10.5 g.), prepared by applying the standard method of Heusler and Wettstein (Helv. Chim. Acta, 1952, 35, 284), to the corresponding 3β-acyloxy 5:6-epoxy compound, in a mixture of dry tetrahydrofuran (100 ml.) and ether (100 ml.) was added to a Grignard reagent prepared from magnesium (5.4 g.), methyl iodide (15 ml.) and ether (190 ml.). The mixture was stirred at room temperature for 2 hours, and then allowed to stand for a further 18 hours. After treatment with dilute sulphuric acid, the organic layer was washed until neutral, dried, and the solvents removed. The residue was heated under reflux for 30 minutes with methanolic potassium hydroxide (100 ml. of 2%). The product obtained by adding water was crystallised from aqueous methanol to give 17α-ethynyl-6-methylandrostane-3β:5α:6:17β-tetrol, needles, M.P. 254 to 255° C., $[\alpha]_D^{20}$ −51° (c. 1.01 in ethanol).

The foregoing tetrol (4 g.) in pyridine (40 ml.) was added to a solution of chromium trioxide (4 g.) in pyridine (40 ml.) and the mixture allowed to stand overnight. The product was isolated with ether and crystallised from aqueous ethanol. 17α-ethynyl-6-methylandrostane-5α:6:17β-triol-3-one formed needles, M.P. 246 to 248° C., $[\alpha]_D^{22}$ −36° (c. 1.02 in ethanol).

The foregoing compound (1 g.) in ethanol (25 ml.) containing two drops of concentrated hydrochloric acid was heated under reflux for 30 minutes. The product was isolated with ether and crystallised from equous methanol. 17α-ethynyl-17β-hydroxy - 6 - methylandrosta-4:6-dien-3-one formed needles, M.P. 200 to 201° C., $[\alpha]_D^{20}$ −58° (c. 1.03 in chloroform), $\lambda_{max}$ 290 mμ (log ε=4.36).

EXAMPLE 2

*6-Methylpregna-4:6-Diene-3:20-Dione (VI)*

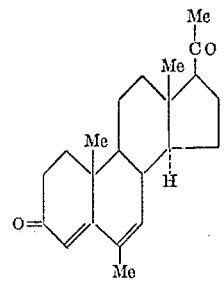

3β:20-diacetoxypregnan-5α-ol-6-one (M.P. 224 to 225° C., $[\alpha]_D^{20}$ −48° in chloroform) (4.3 g.), prepared by applying the standard method of Heusler and Wettstein (Helv. Chim. Acta, 1952, 35, 284), to the corresponding 3β-acyloxy 5:6-epoxy compound, in benzene (200 ml.) was added with stirring to a solution of methylmagnesium iodide prepared from magnesium (4.3 g.) and methyl iodide (12 ml.) in dry ether (100 ml.). The mixture was heated under reflux for 3 hours, cooled, and treated with ice-cold aqueous ammonium chloride. The solids obtained were crystallised from acetone/hexane, giving 6-methylpregnane-3β:5α:6:20-tetrol, needles, M.P. 220 to 224° C., $[\alpha]_D^{22}$ −17° (c. 0.24 in chloroform).

The foregoing tetrol (1.5 g.) in pyridine (15 ml.) was added to chromium trioxide (3 g.) in pyridine (30 ml.) and the mixture allowed to stand overnight. It was then filtered through a filter-aid and the solids washed with hot benzene (600 ml.). The combined filtrate and washings were washed in turn with dilute hydrochloric acid, aqueous sodium carbonate and water, then dried and passed through a short column of alumina. Elution with ether gave 6-methylpregnane-5α:6-diol-3:20-dione, which crystallised from acetone/hexane in needles, M.P. 247 to 249° C., $[\alpha]_D^{22}$ +69° (c. 0.39 in chloroform).

The foregoing compound (300 mg.) in methanol (50 ml.) containing two drops of concentrated hydrochloric acid was heated under reflux for 30 minutes. The mixture was poured into a relatively large volume of water, and the precipitated solids collected, washed and dried. Crystallisation from hexane gave 6-methylpregna-4:6-diene-3:20-dione, plates, M.P. 152 to 154° C., $[\alpha]_D^{22}$ +176° (c. 0.56 in chloroform), $\lambda_{max}$ 288.5 mμ (log ε=4.37).

EXAMPLE 3

*6:17α-Dimethyl-17β-Hydroxyandrosta-4:6-Dien-3-One (VII)*

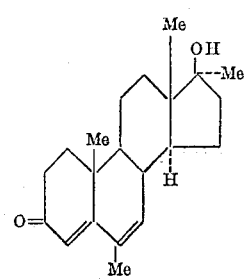

3β - acetoxy - 5α:17β - dihydroxy - 17α - methylandrostan-6-one (M.P. 207 to 208° C., $[\alpha]_D^{24}$ —98° in chloroform) (6.5 g.), prepared by applying the standard method of Heusler and Wettstein (Helv. Chim. Acta, 1952, 35, 284), to the corresponding 3β-acyloxy 5:6-epoxy compound, in ether (300 ml.) was added to a Grignard reagent prepared from magnesium (6.5 g.) and methyl iodide (42 g.) in a mixture of ether (300 ml.) and benzene (200 ml.). The mixture was heated under reflux for 3½ hours, cooled, treated with aqueous ammonium chloride, and the solid product collected and washed. It was saponified by heating under reflux for 1 hour with potassium carbonate (4 g.) in methanol (180 ml.) and water (20 ml.). The solvents were removed and the residue extracted with hot acetone. Addition of hexane gave 6:17α-dimethylandrostane-3β:5α:6:17β-tetrol, needles, M.P. 233 to 234° C., $[\alpha]_D^{20}$ —24° (c. 0.55 in ethanol).

The foregoing tetrol (1.8 g.) in pyridine (18 ml.) was added to a solution of chromium trioxide (1.8 g.) in pyridine (18 ml.) and the mixture allowed to stand overnight. The product, isolated with benzene, was crystallised from acetone/hexane, giving 6:17α - dimethylandrostane - 5α:6:17β-triol-3-one, needles, M.P. 223 to 224° C., $[\alpha]_D^{23}$ —25° (c. 0.53 in chloroform).

The foregoing compound (1.85 g.) in methanol (20 ml.) containing concentrated hydrochloric acid (0.3 ml.) was heated under reflux for 1 hour. The product, isolated with ether, was purified from acetone/hexane to give 6:17α-dimethyl-17β-hydroxyandrosta-4:6-dien-3-one, M.P. 157 to 158° C., $[\alpha]_D^{23}$ +38° (c. 0.52 in chloroform), $\lambda_{max}$ 290 mμ (log ε=4.37).

EXAMPLE 4

*6-Methylandrosta-4:6-Diene-3:17-Dione (VIII)*

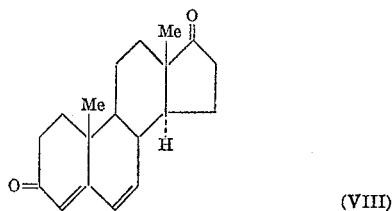

(VIII)

3β:17β-diacetoxy-5α-hydroxyandrostan - 6 - one (4 g.), prepared by the standard method of Heusler and Wettstein (Helv. Chim. Acta, 1952, 35, 284), in benzene (250 ml.) was added to a Grignard reagent prepared from magnesium (4 g.) and methyl iodide (25 ml.) in ether (50 ml.). The mixture was heated under reflux for 2 hours, cooled, and treated with aqueous ammonium chloride. The solids obtained were saponified with aqueous methanolic potassium carbonate to give 6-methylandrostane-3β:5α:6:17β-tetrol, which crystallised from acetone in needles, M.P. 195 to 205° C. softens, $[\alpha]_D^{21}$ —24° (c. 0.25 in ethanol).

The foregoing compound (3.3 g.) in pyridine (33 ml.) was added to a solution of chromium trioxide (6.6 g.) in pyridine (66 ml.), and the mixture allowed to stand overnight. The product was isolated with benzene, purified chromatographically, and crystallised from aqueous acetone. 5α:6 - dihydroxy-6-methylandrostane-3:17-dione formed needles, M.P. 242 to 244° C., $[\alpha]_D^{21}$ +65° (c. 0.57 in chloroform).

The foregoing compound (0.5 g.) in methanol (20 ml.) containing two drops of concentrated hydrochloric acid was heated under reflux for 1 hour. The solid obtained on the addition of water was washed, dried, and crystallised from acetone/hexane. 6-methylandrosta-4:6-diene-3:17-dione separated in needles, M.P. 164° C., $[\alpha]_D^{21}$ +139° (c. 0.51 in chloroform), $\lambda_{max}$ 287 mμ (log ε=4.37).

We claim:

1. 6-methylandrosta-4:6-diene-3:17-dione.
2. 17β-hydroxy-17α-ethynyl-6-methylandrosta-4:6-dien-3-one.
3. 17α - ethynyl-6-methylandrostane-3β:5α:6:17β-tetrol, M.P. 254 to 255° C., $[\alpha]_D^{20}$ —51° (c. 1.01 in ethanol).
4. 17α-ethynyl-6-methylandrostane-5α:6:17β-triol-3-one, M.P. 246 to 248° C., $[\alpha]_D^{20}$ —36° (c. 1.02 in ethanol).
5. 6-methylpregnane-3β:5α:6:20-tetrol, M.P. 220 to 224° C., $[\alpha]_D^{22}$ —17° (c. 0.24 in chloroform).
6. 6-methylpregnane-5α:6-diol-3:20-dione, M.P. 247 to 249° C., $[\alpha]_D^{22}$ +69° (c. 0.39 in chloroform).
7. 6:17α-dimethylandrostane-3β:5α:6:17β-tetrol, M.P. 233 to 234° C., $[\alpha]_D^{20}$ —24° (c. 0.55 in ethanol).
8. 6:17α - dimethylandrostane - 5α:6:17β - triol - 3-one, M.P. 223 to 224° C., $[\alpha]_D^{23}$ —25° (c. 0.53 in chloroform).
9. 6-methylandrostane-5α:6-diol-3:17-dione, M.P. 242 to 244° C., $[\alpha]_D^{21}$ +65° (c. 0.57 in chloroform).
10. A method for the preparation of 6-methyl-3-oxo-4:6-dienic steroids of the androstane and pregnane series, comprising: reacting the corresponding 3β-acyloxy-5α-hydroxy-6-oxo steroid having in rings A and B the following structure:

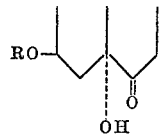

(where R is a lower alkanoyl radical) with a methyl magnesium halide to give a corresponding 6-methyl-3β:5α:6-trihydroxy steroid having in rings A and B the following structure:

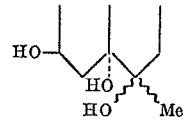

oxidizing the 3β:5α:6-trihydroxy steroid to the corresponding 5α:6-dihydroxy-6-methyl-3-oxo steroid having in rings A and B the following structure:

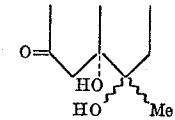

and dehydrating the 5α:6-dihydroxy-6-methyl-3-oxo steroid by reaction in an organic solvent with an ionized substance providing hydrogen ions to provide the corresponding 6-methyl-3-oxo-4:6-dienic steroid having in rings A and B the following structure:

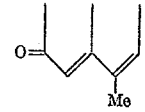

11. A method as claimed in claim 10 wherein a solution of the 3β-alkanoyloxy-5α-hydroxy-6-oxo steroid in a solvent is added to an excess of methyl magnesium iodide.

12. A method as claimed in claim 10 wherein the 3β:5α:6-trihydroxy steroid is oxidised to the corresponding 5α:6-dihydroxy-6-methyl-3-oxo-steroid with chromium trioxide in pyridine solution.

13. The method of claim 10 wherein the 3β-acyloxy-5α-hydroxy-6-oxo steroid starting material is 3β-acetoxy-17α-ethynylandrostane-5α:17β-diol-6-one, the reaction with methyl magnesium halide provides 17α-ethynyl-6-methylandrostane-3β:5α:6:17β-tetrol, the tetrol is oxidized to provide 17α-ethynyl-6-methylandrostane-5α:6:17β-triol-3-one and the latter compound is dehydrated to provide 17α-ethynyl-17β-hydroxy-6-methylandrosta-4:6-dien-3-one.

14. The method of claim 10 wherein the 3β-acyloxy-5α-hydroxy-6-oxo steroid starting material is 3β:20-diacetoxypregnan-5α-ol-6-one, the reaction with methyl magnesium halide provides 6-methylpregnane-3β:5α:6:20-tetrol, the tetrol is oxidized to provide 6-methylpregnane-5α:6-diol- 3:20-dione and the latter compound is dehydrated to provide 6-methylpregna-4:6-diene-3:20-dione.

15. The method of claim 10 wherein the 3β-acyloxy-5α-hydroxy-6-oxo steroid starting material is 3β-acetoxy-5α:17β-dihydroxy-17α-methylandrostan-6-one, the reaction with methyl magnesium halide provides 6:17α-dimethylandrostane-3β:5α:6:17β-tetrol, the tetrol is oxidized to provide 6:17α-dimethylandrostane-5α:6:17β-triol-3-one and the latter compound is dehydrated to provide 6:17α-dimethyl-17β-hydroxyandrosta-4:6-dien-3-one.

16. The method of claim 10 wherein the 3β-acyloxy-5α-hydroxy-6-oxo steroid starting material is 3β:17β-diacetoxy-5-hydroxyandrostan-6-one, the reaction with methyl magnesium halide provides 6-methylandrostane-3β:5α:6:17β-tetrol, the latter compound is oxidized to 5α:6-dihydroxy-6-methylandrostane-3:17-dione and the latter compound is dehydrated to provide 6-methylandrosta-4:6-diene-3:17-dione.

17. The process of claim 10 wherein said dehydration is effected by reaction with HCl in a lower aliphatic alcohol.

References Cited in the file of this patent
UNITED STATES PATENTS

| | | |
|---|---|---|
| 2,312,344 | Logemann | Mar. 2, 1943 |
| 2,738,348 | Colton | Mar. 13, 1956 |
| 2,739,974 | Colton | Mar. 27, 1956 |
| 3,002,969 | Petrow et al. | Oct. 3, 1961 |
| 3,004,966 | Petrow et al. | Oct. 17, 1961 |

OTHER REFERENCES

Journal of Organic Chemistry (1954), vol. 19, article by Florey, pages 1331–50.